United States Patent [19]

Lewis

[11] 4,314,445
[45] Feb. 9, 1982

[54] TURBINE ENGINE THRUST BOOSTER

[76] Inventor: Leon D. Lewis, 28619 Coveridge Dr., Rancho Palos Verdes, Calif. 90274

[21] Appl. No.: 68,279

[22] Filed: Aug. 20, 1979

Related U.S. Application Data

[63] Continuation of Ser. No. 842,751, Oct. 17, 1977, abandoned.

[51] Int. Cl.³ .............................................. F02K 3/12
[52] U.S. Cl. .................................... 60/204; 60/223; 60/224; 60/243
[58] Field of Search ................... 60/39.28 R, 223, 224, 60/243, 204

[56] References Cited

U.S. PATENT DOCUMENTS

| | | | |
|---|---|---|---|
| 3,521,448 | 7/1970 | Amelio | 60/39.28 R |
| 3,601,984 | 8/1971 | Davis | 60/39.28 R |
| 3,832,846 | 9/1974 | Leeson | 60/39.28 R |
| 3,852,956 | 12/1974 | Martin | 60/39.28 R |
| 3,854,287 | 12/1974 | Rembold | 60/39.28 R |
| 3,969,890 | 7/1976 | Nelson | 60/39.28 R |
| 3,987,620 | 10/1976 | Giordano et al. | 60/39.28 R |
| 4,173,119 | 11/1979 | Gruene et al. | 60/39.28 R |

Primary Examiner—Robert E. Garrett
Attorney, Agent, or Firm—Joel D. Talcott; Fay I. Konzem; John H. Lynn

[57] ABSTRACT

Trim signals are removed from the fuel control computers of aircraft propulsion engines to increase thrust upon detection of a predetermined difference between engine speeds.

30 Claims, 4 Drawing Figures

TURBINE ENGINE THRUST BOOSTER

This is a continuation of application Ser. No. 842,751, filed Oct. 17, 1977, abandoned.

This invention relates to gas turbine engines and, more particularly, to a system for automatically boosting engine thrust upon failure or defect in operation of one of a plurality of propulsion engines.

In recent years, gas turbine engines have become widely used to provide propulsion for airplanes. Such engines have been popular because they can provide high thrust levels with relatively great fuel economy. These highly complex engines generally utilize a sophisticated fuel control system. An example of recent development in such fuel control systems is disclosed in U.S. Pat. No. 3,971,208, issued to Glennon Z. Schwent on July 27, 1976 and assigned to the assignee of this invention, to establish a minimum or idle spool speed and a maximum or takeoff spool speed. The maximum engine speed is established at a level which will optimize both airplane performance and engine life.

Problems may occur during the takeoff run of an airplane which can result in a partial or complete loss of power to one of an airplane's plurality of engines. If such a problem occurs after the airplane has passed $V_1$, the point at which the airplane no longer has sufficient runway remaining to permit it to safely come to a complete stop, substantial injury may result unless additional power is made available to the operating engine(s) sufficient to permit a safe takeoff of the aircraft. To this end, emergency power systems have been utilized in conjunction with both single and multi-engine airplanes.

These systems are classifiable into several types. In one type of system upon the failure of a computer control or fuel control system for one of a pair of engines, the operational control or computer control may be used in conjunction with both engines simultaneously. Exemplary of such systems are Martin U.S. Pat. No. 3,811,273 and Eccles et al. U.S. Pat. No. 3,875,390. Such systems do not provide any added power.

In other systems, emergency power is provided by the injection of a water/methanol mixture into the engines. Such systems are represented by Donaldson U.S. Pat. No. 3,434,281 and Britten et al. U.S. Pat. No. 3,518,923. Systems of this type require added fluid tanks and plumbing and valve control systems.

Another class of systems simply disconnects auxiliary power using units on board the plane or disconnects the defective drive motor so that available power in the remaining engines may be conserved. Exemplary of such systems are Clare et al. U.S. Pat. No. 2,322,114 and Gregoire et al. U.S. Pat. No. 3,514,055. These systems also provide no added power.

Another class of systems does in fact provide a boost in engine thrust without the need for added fuel tanks. These systems detect failure or defect of an engine and actuate solenoid valves of an emergency fuel flow system to provide increased amounts of fuel to the engines. Typical of such systems are Dray et al. U.S. Pat. No. 2,628,472, Tyler et al. U.S. Pat. No. 3,161,021 and Borelan et al. U.S. Pat. No. 3,987,279.

Such systems, however, suffer from several drawbacks. For example, the system cannot operate if there is a failure of power to its control circuitry or to the solenoids. Additionally, in the event of an aborted takeoff after operation of such a prior art system, the fuel control solenoids would have to be de-energized to permit a reduction in engine thrust to stop the airplane.

These drawbacks are overcome by the automatic performance reserve system of the present invention. The fuel control computer for each engine, instead of being set for optimum engine performance, is set for the higher level of engine spool speed required for increased emergency engine thrust levels. Trim signals are provided to the computer to counteract this setting and limit the maximum engine operation to the normal optimum operating levels. Upon occurrence of an engine defect, such as would be evidenced by a difference in engine spool speed between two engines, the trim signals are removed, and the engines are permitted to perform at enhanced thrust levels. Manual operation of the APR system may readily be accomplished simply by turning off electrical power to the unit to terminate the trim signals. Because the system operates by establishing higher operating levels in the fuel control computer and not by operation of additional valves to augment fuel flow, it is not necessary to manually or otherwise terminate operation of the automatic performance reserve system if it is decided to abort takeoff and stop the engines. Engine thrust can be diminished simply by operation of the power levers.

Fail safe operation is provided by the system of this invention due to its operation by removing trim signals from the fuel control computer. Upon failure of electrical power to the APR system, these trim signals would automatically be removed and the engines permitted to operate at an increased thrust level. If increased thrust level is not desired, the pilot can compensate by adjusting the power lever position.

These and other advantages of the thrust boosting system of this invention will be more readily apparent when the following specification is read in conjunction with the appended drawings, wherein.

Figure 1:
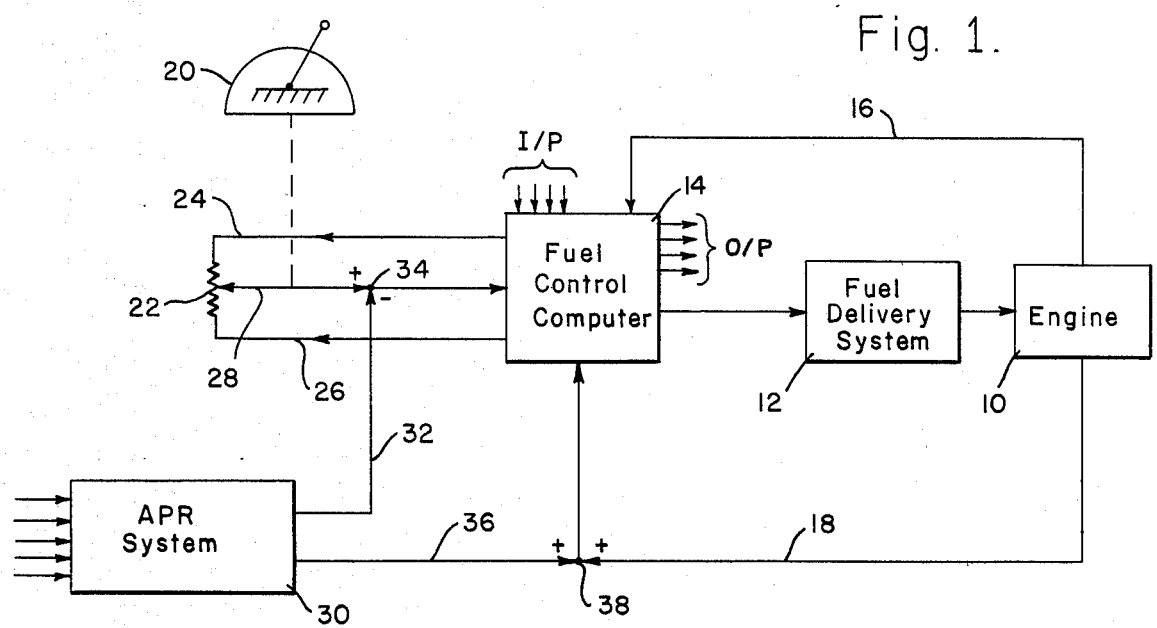
FIG. 1 is a generally schematic diagram illustrating a gas turbine engine fuel control system in accordance with this invention.

Referring now to FIG. 1, a gas turbine engine 10 is operated with a suitable fuel which is provided by a fuel delivery system 12 which may include appropriate storage tanks and valves for controlling fuel flow from the tanks to the engines. Fuel delivery system 12 controls the flow of fuel to the gas turbine engine 10 in accordance with a fuel command signal which is received from a fuel control computer 14. Appropriate inputs and outputs are provided to and by the fuel control computer 14 in accordance with the requirements of the particular engine control system. An example of such inputs and outputs is illustrated in the aforementioned Schwent U.S. Pat. No. 3,971,208. Two particular inputs specifically utilized in describing the operation of this invention comprise a speed feedback signal received through a path 16 and a temperature feedback signal received through a path 18 for monitoring rotational velocity of an engine spool, preferably the high pressure spool in an engine having a plurality of spools, and engine exhaust temperature, respectively.

The computer 14 controls the amount of thrust produced by the engine 10 in response to the commands dictated by position or angle of a power lever 20. The power lever 20 is connected to the wiper of a rheostat 22. The rheostate 22 is connected to the fuel control computer 14 by conductors 24 and 26 which establish a voltage drop across rheostat 22 between voltages corresponding to maximum speed and minimum speed, respectively. The wiper of the rheostat 22 is connected by a conductor 28 to carry a signal indicative of power lever angle and, accordingly, desired engine speed to the fuel control computer 14. In response to this signal, the fuel control computer transmits a fuel command to the fuel delivery system 12 which provides the appropriate amount of fuel to the engine 10.

Figure 3:
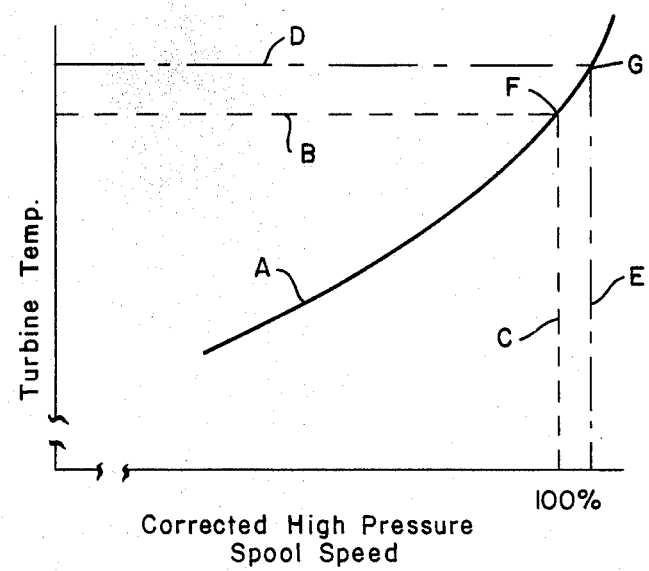
FIGS. 3 and 4 are graphs illustrating operation of the automatic performance reserve system of FIG. 2.

It is necessary to program the fuel control computer 14 to limit speed of the high pressure spool and limit turbine exhaust temperature to optimize airplane performance and engine life. The establishment of these limits determines the maximum amount of thrust which may be produced by the engine. This relationship of spool speed and exhaust temperature is shown in FIG. 3 wherein an engine running line A for a typical gas turbine engine is shown with turbine exhaust temperature plotted along the vertical axis and high pressure spool speed (corrected for temperature) plotted along the horizontal axis. The dashed line B illustrates maximum permissible turbine exhaust temperature, and the dashed line C is indicative of maximum permissible spool speed (100% speed) characteristic of optimum performance levels. In emergency situations, it is desirable to increase available engine thrust.

Because prior art fuel systems are set to limit turbine temperature and spool speed, any command requesting higher thrust would be thwarted by action of the control system. For this reason, it has been necessary to provide the additional thrust through use of independently controlled, solenoid actuated, control valves.

In accordance with this invention, the computer 14 is preset to permit the engine, under certain conditions, to reach a higher level of exhaust temperature, indicated by the line D, and a higher level of spool speed, indicated by line E. This adjustment permits the engine to enhance its available thrust from a level corresponding to engine performance at point F on curve A to the higher level corresponding to point G.

However, it would not be desirable, as already discussed, to permit the engine to run continuously within these high limits. Thus, an automatic performance reserve (APR) system 30 is provided to control the fuel control computer 14 for selectively switching between a normal operating mode, wherein the engine is capable of producing thrust corresponding to point F in FIG. 3, and an APR mode, wherein the engine is capable of producing thrust corresponding to point G.

The APR system 30 produces two outputs for each engine being controlled. A speed trim signal is transmitted through a conductor 32 to a summing junction 34 interposed in the speed command conductor 28. A temperature trim signal is transmitted through a conductor 36 to a summing junction 38 in the temperature feedback path 18.

The speed trim signal modifies the speed command received from the rheostat 22 such that, whenever the power lever is in the maximum speed position and the APR system 30 is providing a speed trim signal, the fuel control computer will receive a speed command calling for spool speed to be maintained at the level indicated as C instead of the maximum level E. Corresponding reductions in spool speed occur at all settings of the power lever.

At the same time, the temperature trim signal combines with the temperature feedback signal to indicate to the fuel control computer that the exhaust temperature of the engine 10 is greater than it actually is by an amount $\Delta T$ equal to the temperature difference between levels B and D in FIG. 3.

Accordingly, as long as the APR system 30 is producing its output trim signals, engine thrust will be limited such that the engine is permitted to operate only within normal limits. When the APR system 30 ceases to produce the trim signals, thrust is permitted to increase from the normal limit (point F) to the emergency limit (point G) on the engine running line A by the increase in high pressure spool speed and permissible temperature otherwise allowed by the fuel control computer 14.

Figure 2:
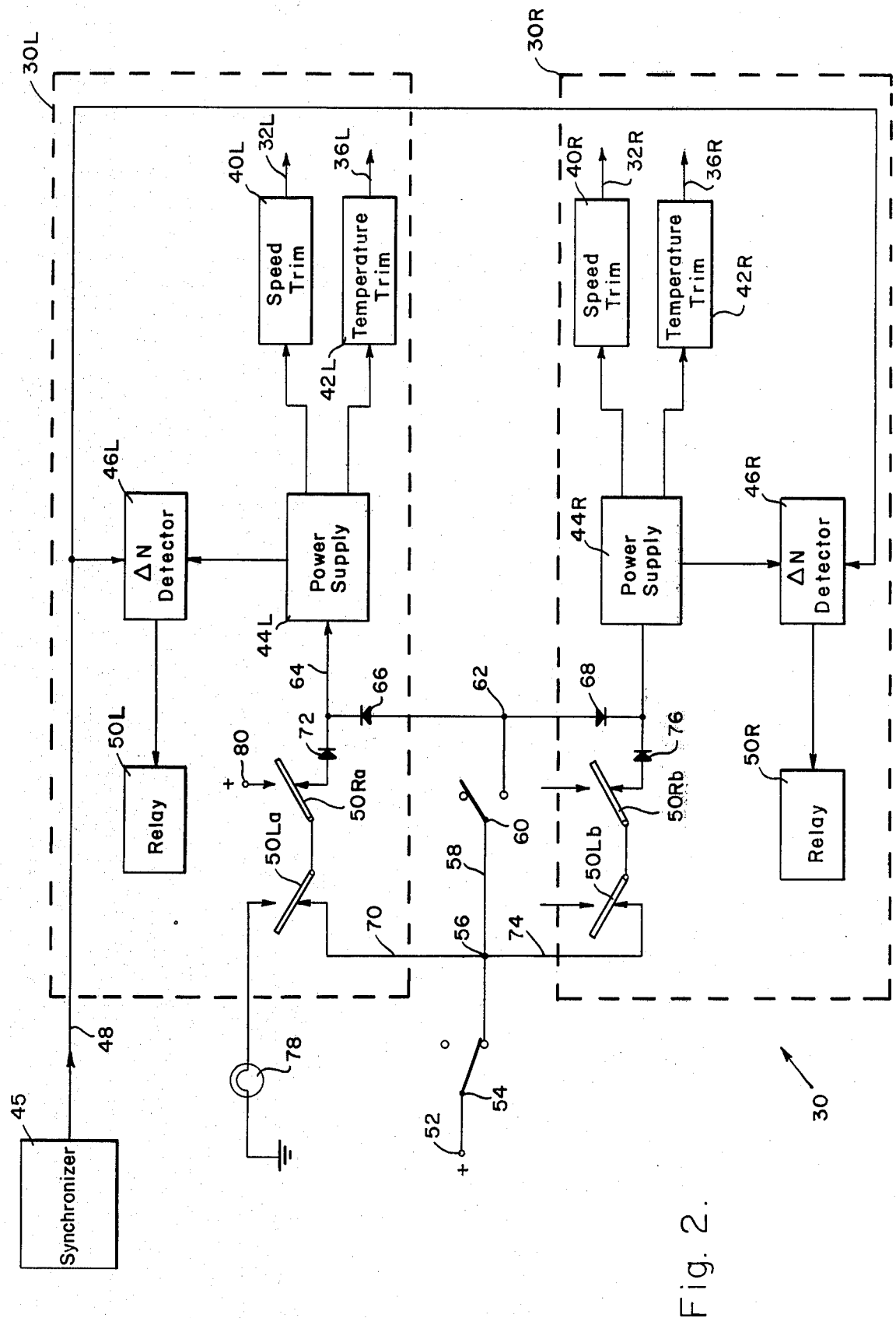
FIG. 2 is a generally schematic diagram of an automatic performance reserve system for use in the fuel control system of FIG. 1.

The APR system 30 is best illustrated in FIG. 2 and comprises a pair of substantially identical units 30L and 30R for controlling the fuel control computers of the left and right engine, respectively. Identical components will be described using the same reference numerals, but specific reference to one of a pair of so-numbered components will be made using the letter L to designate the component in the left portion 30L and the letter R to correspond to components of the right portion 30R. While this two channel system is designed to operate in conjunction with an airplane having two engines, it should be noted that any number of engines could be readily accommodated by an APR system in accordance with this invention.

Each of the left and right APR unit portions has a speed trim signal generator 40, which transmits the speed trim signal through its corresponding conductor 32, and a temperature trim signal generator 42, which transmits the temperature trim signal through its corresponding conductor 36. The speed and temperature trim signal generators produce these signals whenever they are receiving power from their corresponding power supply 44 to which they are connected by suitable conductors.

Each power supply 44 also provides operating power for a $\Delta N$ detector 46. Each $\Delta N$ detector receives a signal which is functional of the difference between the speed of the high pressure spool of two engines. While this signal may be produced by any convenient means, in the preferred embodiment it is received from an engine speed synchronizer 45 through conductor 48. The synchronizer 45 may be of any suitable type, well known to those skilled in the art.

Each $\Delta N$ detector 46 is connected to energize a relay 50 when the difference between engine speeds reaches a predetermined value. Each of the relays 50 is connected for operation of contacts within both of the APR unit protions 30L and 30R. The relay 50L has contact 50L$a$ in APR portion 30L and 50L$b$ in APR portion 30R. The relay 50R has contacts 50R$a$ in portion 30R and 50R$b$ in portion 30L.

Power for each power supply 44 is received from a voltage source 52 through a switch 54 and a junction 56. From the junction 56 energization of the power supplies 44 is through independent parallel sources. A conductor 58 connects the junction 56 through a switch 60 to a junction 62. A conductor 64 is connected between the power supply 44L through a diode 66, the junction 62 and a diode 68 to the power supply 44R. A conductor 70 connects the junction 56 through contact 50L$a$ and contact 50R$b$ and a diode 72 to power supply 44L. A conductor 74 connects junction 56 through contact 50L*b*, contact 50R*a* and a diode 76 to power supply 44R.

An alternate terminal of contact 50L*a* is connected to a suitable indicator such as a light 78, and an alternate terminal of contact 50R*b* is connected to a source of voltage 80.

Operation of the automatic performance reserve system of this invention will now be described. As has already been discussed the fuel control computer 14 (FIG. 1) is adjusted to permit operation of the engine 10 at the enhanced power levels to be provided by the APR system 30. However, as long as speed and temperature trim signals are received from the speed trim signal generators 40 and temperature trim generators 42 associated with each engine, the fuel control computer will be limited to operation within a normal limit. These trim signals will be produced as long as the power supplies 44L and 44R are energizing the signal generators.

Switches 54 and 60 are manually operated switches mounted on a flight deck panel in conjunction with the APR function light 78. Opening of the switch 54 removes all power from the APR unit and thus terminates generation of speed and temperature trim signals so as to act as a manual APR operating switch. When the switch 54 is closed, automatic functioning of the APR systemm 30 is possible.

Whenever switch 54 is closed, switch 60 serves as an arm/disarm switch. As long as switch 60 is closed, the power supplies 44 will be energized so as to result in the generation of speed and temperature trim signals. Thus, when the switch 60 is closed, the APR system is said to be "disarmed" in that automatic functioning is impossible. When the switch 60 is open, energization of power supplies 44 is through the contacts of the relay systems 50 so that automatic functioning, in a manner to be described, is possible. Thus when the switch 60 is open, the system is said to be "armed."

With the system armed, energization of power supply 44L is from the voltage source 52 through switch 54, contact 50L*a* and contact 50R*b*. Energization of power supply 44R is from voltage source 52 through switch 54, contact 50L*b* and contact 50R*a*.

When both engines are operating properly, such that any difference in spool speed is less than the predetermined level detected by the ΔN detectors 46, the relays 50 are in an energized state such that the contacts associated therewith close the circuits for energization of the power supplies 44. Should a difference in spool speed between engines occur which is of a magnitude greater than the pedetermined level detectable by the ΔN detectors, the signal from the synchronizer 45 will cause each of the ΔN detectors 46L and 46R to de-energize its associated relay 50L and 50R, respectively. De-energization of relay 50L opens contact 50L*a* and 50L*b*. De-energization of relay 50R open contacts 50R*a* and 50R*b*.

The opening of the contacts for either of the relays terminates the application of power to both power supplies 44L and 44R to terminate generation of speed and temperature trim signals. Thus, the use of two ΔN detectors 46L and 46R and two associated relays 50L and 50R provides redundancy in that operation of either speed detector and its associated relay will produce the desired boost in thrust to both engines.

When contacts 50L*a* and 50R*b* open, they also close their alternate terminals to complete a circuit connecting the APR function light 78 to the voltage source 80.

Illumination of light 78 indicates to the pilot that the APR unit has functioned. If either relay 50L or 50R does not properly operate, the light will not illuminate and will provide an indication of malfunction of one of the channels. Unless both channels have failed, the APR system will still operate properly in its automatic mode.

The APR function light 78 also provides a means for testing automatic operation of the APR system 30 prior to takeoff. With the switch 54 in the closed or "automatic" position and the switch 60 in the open or "armed" position, the power lever 20 for each engine may be adjusted so that the difference between the spool speeds of the two engines or ΔN is greater than the predetermined value required for operation of the relays 50. This should trigger operation of the relays 50L and 50R to cause a change in condition of contacts 50L*a* and 50R*b*, respectively, and energize the APR function light 78. If either relay 50L or 50R fails to operate, the light will fail to function because one of the two contacts will remain in its original position. If the APR function light has failed to illuminate during operation on test, the pilot can determine whether a single or dual channel failure has occurred by examination of his flight instruments.

Figure 4:
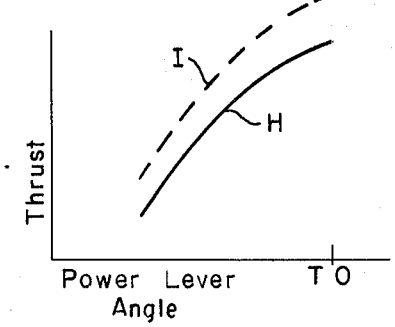

FIG. 4 illustrates the relationship of engine thrust plotted on the vertical axis to power lever angle plotted on the horizontal axis. Curve H shows the relationship between engine thrust and the power lever angle when the engine is under normal control, which means that the speed and temperature trim signals are being applied to the fuel control computer 14. Curve I gives the same relationship for the same engine operating under emergency conditions wherein the speed and temperature trim system have been removed from fuel control computer 14. As can be seen at the point indicated as TO on the horizontal axis, indicating the power lever position corresponding to engine takeoff power, a significant increase in thrust is provided by the removal of trim signals by the APR unit 30. However, as the power lever is moved toward the idle position, the thrust increase is greatly diminished. As a result, not only can actual operation of the APR system 30 be tested while the engines are at or near idle speed but it is also unnecessary to manually terminate operation of the system to permit the engines to be cut to a thrust level permitting an airplane to be safely stopped.

To prepare the APR system 30 for operation prior to takeoff of an airplane, the switch 54 is placed in the closed (automatic) position. The switch 60 is then placed in the closed (disarmed) position so that the power supplies 44 will be energized. This will cause the speed trim signal generators 40 and temperature trim signal generators 42 to transmit their outputs to the fuel control computer 14 resulting in engine operation in a conventional mode. If there is no difference between spool speeds of the engines greater than the predetermined value, energization of the power supply will also cause the relays 50 to activate their contacts, causing the power supplies 44 to be energized therethrough. After this has occurred, the switch 60 may be changed to open (armed) configuration.

To affect takeoff, the power levers are moved to the takeoff position causing a corresponding increase in thrust along the curve designated H in FIG. 4. To avoid triggering of the APR system due to uneven movement of the power levers, it is preferable that switch 60 remain in the "disarm" position until commencement of the takeoff roll. As long as both engines 10 operate in a normal manner, the speed and temperature trim signals generators will continue to be energized by the power supplies 44; and no change in engine thrust will be caused by the APR system 30. However, should a malfunction occur in one of the engines, this will result in a change in its spool speed such that a ΔN signal will be transmitted by the synchronizer 45 to the ΔN detectors 46. As soon as this signal indicates a difference in spool speeds at least equal to be the predetermined value, the relays 50L and 50R will be energized, opening the contacts to remove power from the power supplies 44. As a result, the speed and the temperature trim signals will be removed from both engines, resulting in an increase in high pressure spool speed and a permissive increase in engine exhaust temperature, which will change the thrust from curve H in FIG. 4 to the corresponding point on the curve I. It should be understood, however, that this increase in thrust will only apply to a properly operating engine. Any increase in thrust or power level of a defective engine will depend upon the nature and the magnitude of the defect. However, a significant increase in available thrust will be provided for the airplane.

The opening of the relay contacts completely disconnects the power supplies 44 from their source of power 52 so that inadvertent removal of the increased thrust by accidental automatic application of the trim signals is not possible. This could only occur by action of the flight crew in changing the configuration of the switch 60 from its open or armed mode to the closed or disarmed mode, whereupon the trim signals would again be applied to the fuel control computer 14.

Should automatic functioning of the APR unit 30 fail for any reason so that the contacts of relays 50L and 50R remain closed, engine thrust may still be increased manually by the pilot simply by changing the position of the switch 54 from the closed (automatic) position to the open (manual) position wherein power is immediately removed from the power supplies 44 and application of the trim signals is terminated.

Accordingly, a turbine engine thrust boosting system is disclosed wherein thrust is enhanced by modification of inputs to a fuel control computer to permit the engine to increase temperature and speed parameters to result in increased thrust. No additional fuel control valving is required, and the system provides additional safety of operation by not requiring manual shutoff to stop the airplane and providing fail safe operation, which results in increased thrust upon occurrence of a failure of power to the APR unit.

I claim:
1. In combination:
an engine having a normal maximum thrust level and emergency maximum thrust level;
means for controlling engine fuel delivery to adjust engine thrust within a range having an upper limit not greater than said emergency maximum thrust level;
means for generating engine thrust trim signals for limiting engine thrust to said normal maximum thrust level;
means for energizing said trim signal generating means;
means for producing an output signal indicative of engine malfunction; and
means, responsive to said engine malfunction output signal, for controlling the application of said trim signals to said fuel delivery control, said trim signal application controlling means interposed between said trim signal generating means and said energizing means for selectively disconnecting said trim signal generating means from said energizing means.

2. The combination of claim 1 wherein said trim signal application controlling means includes parallelly connected relay means and switch means, said switch means selectively positionable in a first configuration for short circuiting said relay means to prevent de-energization of said trim signal generating means and a second configuration permitting de-energization of said trim signal generating means.

3. The combination of claim 1 wherein said trim signal application controlling means additionally includes a serially connected manual operating switch means for independently operably disconnecting said trim signal generating means from said energizing means.

4. An engine fuel control system comprising:
means for controlling the delivery of fuel to an engine;
means for providing input to said fuel delivery control means for causing engine operation between a minimum operating level and a maximum operating level;
means for adjusting said fuel delivery control means to operate in an emergency mode wherein said maximum operating level has a first predetermined value;
trim means operative for causing said fuel delivery control means to operate in a normal mode wherein said maximum operating level has a second predetermined value less than said first predetermined value; and
means for terminating effect of said trim means of said fuel delivery control means upon occurrence of an emergency condition.

5. The engine fuel control system of the claim 4 wherein said trim means comprises trim signal generator means for transmitting trim signals to said fuel delivery control means, and said emergency trim terminating means comprises switching means for terminating transmission of said trim signals to said fuel delivery control means.

6. The engine fuel control system of claim 5 including first and second engines, each having a rotating element, and wherein said switching means terminates transmission of trim signals to said fuel delivery control means upon occurrence of a predetermined difference in a speed between said first and second engine rotating elements.

7. The engine fuel control system of claim 6 wherein said trim signal generating means is energized by a source of voltage, and said switching means is interposed between said voltage source and said trim signal generating means for selectively disconnecting said trim signal generating means from said voltage source.

8. The engine fuel control system of claim 7 wherein said switching means includes relay means responsive to said predetermined difference in speed between said first and second engine rotating elements for automatically disconnecting said trim signal generating means from said voltage source.

9. The engine fuel control system of claim 8 including indicator means energized upon operation of said relay means for indicating disconnection of said trim signal generating means.

10. The engine fuel control system of claim 8 wherein said relay means includes contacts and said switching means include arming switch means connected in parallel with said relay means contacts and selectively positionable in a first configuration for short circuiting said relay means contacts to prevent deenergization of said trim signal generator means and in a second configuration permitting de-energization of the trim signal generating means by said relay.

11. The engine fuel control system of claim 8 wherein said switching means includes manual operating switch means serially connected with said relay means contacts between said voltage source and said trim signal generating means, independently operable for disconnecting said trim signal generating means from said voltage source.

12. In an airplane having at least two gas turbine propulsion engines and a fuel delivery control system including a manually operated power lever for each engine, the improvement comprising:
   means for sitting the fuel delivery control means for each engine such that said power levers operate said engines within a first operating range;
   means for trimming said fuel delivery control system such that said power levers operate said engines within a second operating range; and
   means responsive to engine malfunction for removing said trim means to permit operation of said engine in said first operating range.

13. The propulsion system of claim 12 wherein each engine has a rotating spool, and said trim means comprises speed trim signal generator means for reducing the speed of spool rotation of each engine, and temperature trim generator means for reducing the maximum permissible engine exhaust temperature for each engine.

14. The propulsion system of claim 13 wherein said engine malfunction responsive means comprises relay means for terminating generation of trim signals, and means responsive to a difference in rotational speed between said engine spools for actuating said relay means on occurrence of a predetermined difference.

15. The propulsion system of claim 14 wherein said trim signal generator means are energized by a voltage source and said relays means have contacts interposed between said trim signal generator means and said voltage source.

16. The propulsion system as in claim 15 including arming switch means connected in parallel with said relay means contacts and selectively positionable in a first configuration for short circuiting said relay means contacts to prevent de-energization of said trim signal generator means and in a second configuration permitting deenergization of the trim signal generating means by said relay.

17. The propulsion system of claim 15 including manual operating switch means serially connected with said relay means contacts between said voltage source and said trim signal generating means, and independently operable for disconnecting said trim signal generating means from said voltage source.

18. A method of controlling transfer of an engine from a normal operating condition to an emergency operating condition, said method comprising the steps of:
   powering the engine with a fuel control adjusted for operation under emergency operating conditions;
   applying trim signals to said fuel control for changing the engine to operation under normal operating conditions; and
   terminating application of said trim signals upon occurrence of an emergency condition.

19. The method of claim 18 wherein said step of applying trim signals comprises the steps of:
   connecting said fuel control to receive trim signals from signal generators; and
   energizing said trim signal generators by connection through contacts of a relay to a voltage source; and
   the step of terminating said trim signals comprises:
   opening said relay contacts upon occurrence of an engine malfunction.

20. A method of applying emergency power for an airplane having two or more propulsion engines, each having a fuel delivery control system associated therewith, said method comprising the steps of:
   setting each fuel delivery control system to permit maximum engine speed and exhaust temperature such that an emergency thrust level for the engine is permissible;
   applying speed and temperature trim signals to each fuel delivery control system to limit engine speed and exhaust temperature to levels associated with normal engine thrust conditions;
   detecting the difference between speeds of the engines; and
   terminating application of said speed and temperature trim signals upon the difference between engine speed reaching a predetermined value.

21. A turbine engine thrust control system, comprising:
   at least one turbine engine operable in a normal thrust range having a normal maximum thrust and an enhanced thrust range having an enhanced maximum thrust, the enhanced maximum thrust being greater than the normal maximum thrust;
   control means set for operating said turbine engine within said enhanced maximum thrust range;
   trim means for applying a trim signal to said control means to maintain said turbine engine within said normal thrust range under normal operating conditions, said trim signal means including means for generating a temperature trim signal to limit said turbine engine to operation within a predetermined normal temperature range, and means for generating a speed trim signal to limit the high pressure spool speed of said turbine engine to operation within a predetermined normal speed range; and
   switch means for selectively terminating application of said trim signal to said control means to permit said turbine engine to operate within said enhanced thrust range.

22. A turbine engine thrust control system according to claim 21 wherein said control means comprises fuel control computer means, responsive to command signals input thereto, for producing a signal to control the delivery of fuel to said turbine engine.

23. A turbine engine thrust control system according to claim 21 or 22 further including means for generating a signal indicative of engine malfunction, said switch means being responsive to the engine malfunction signal for terminating application of the trim signals to said control means.

24. A turbine engine thrust control system, comprising:

at least one turbine engine operable in a normal thrust range having a normal maximum thrust and an enhanced thrust range having an enhanced maximum thrust, the enhanced maximum thrust being greater than the normal maximum thrust;

control means set for controlling said turbine engine within said enhanced maximum thrust range;

trim signal means for applying a trim signal to said control means to maintain said turbine engine within said normal thrust range under normal operating conditions;

means for generating a signal indicative of engine malfunction; and switch means, responsive to said engine malfunction signal, for selectively terminating application of said trim signal to said control means to permit said turbine engine to operate within said enhanced thrust range.

25. A thrust control system for a plurality of turbine engines, each of the turbine engines having a normal thrust range having a normal maximum thrust and an enhanced thrust range having an enhanced maximum thrust, the enhanced maximum thrust for each said turbine engine being greater than the normal maximum thrust thereof, comprising:

control means set for operating each of the turbine engines within said enhanced maximum thrust range;

trim means for applying a trim signal to said control means to maintain each of the turbine engines with the normal thrust range under normal operating conditions, said trim means including means for generating a temperature trim signal for each of the turbine engines to limit operation thereof to a predetermined normal temperature range, and means for generating a speed trim signal for each of the turbine engines to limit the high pressure spool speed thereof to operation within a predetermined normal speed range; and switch means for terminating application of said trim signal to said control means to permit the turbine engines to operate within said enhanced maximum thrust range.

26. A thrust control system according to claim 25 wherein said control means comprises a fuel control computer means responsive to command signals input thereto for producing a signal to control the delivery of fuel to each turbine engine.

27. A thrust control system according to claim 26 further including means for generating a signal indicative of engine malfunction, said switch means being responsive thereto for terminating application of the trim signals to said control means to permit the turbine engines to operate within the enhanced thrust range.

28. A thrust control system according to claim 27 wherein said engine malfunction indicating means generates an engine malfunction signal at a predetermined difference in turbine engine speeds.

29. A thrust control system for a plurality of turbine engines, each of the turbine engines having a normal thrust range having a normal maximum thrust and an enhanced thrust range having an enhanced maximum thrust, the enhanced maximum thrust for each turbine engine being greater than the normal maximum thrust thereof, comprising:

control means set for operating each of the turbine engines within said enhanced maximum thrust range;

trim means for applying a trim signal to said control means to maintain each of the turbine engines within the normal thrust range under normal operating conditions;

means for generating a signal indicative of engine malfunction; and switch means responsive to said engine malfunction signal for terminating application of said trim signal to said control means to permit the turbine engines to operate within said enhanced thrust range.

30. A thrust control system according to claim 29 wherein said engine malfunction indicating means generates an engine malfunction signal at a predetermined difference in turbine engine speeds.

* * * * *

UNITED STATES PATENT AND TRADEMARK OFFICE
CERTIFICATE OF CORRECTION

PATENT NO. : 4,314,445
DATED : February 9, 1982
INVENTOR(S) : Leon D. Lewis

It is certified that error appears in the above—identified patent and that said Letters Patent is hereby corrected as shown below:

Column 8, line 36 "of" (second occurrence) should read -- on --.

Column 9, line 21 "sitting" should read -- setting --.

Signed and Sealed this

Thirteenth Day of April 1982

[SEAL]

Attest:

GERALD J. MOSSINGHOFF

Attesting Officer      Commissioner of Patents and Trademarks